United States Patent
Crowther et al.

(10) Patent No.: US 9,928,089 B2
(45) Date of Patent: Mar. 27, 2018

(54) OPTIMIZING SOFTWARE CODE

(71) Applicant: International Business Machines Corporation, Armonk, NY (US)

(72) Inventors: Fiona M. Crowther, Manchester (GB); Geza Geleji, Eastleigh (GB); Christopher J. Poole, Hampshire (GB); Martin A. Ross, Hampshire (GB); Craig H. Stirling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/735,336

(22) Filed: Jun. 10, 2015

(65) Prior Publication Data
US 2015/0378757 A1 Dec. 31, 2015

(30) Foreign Application Priority Data

Jun. 26, 2014 (GB) .................................. 1411364.1

(51) Int. Cl.
*G06F 9/45* (2006.01)
*G06F 9/455* (2006.01)

(52) U.S. Cl.
CPC ........ *G06F 9/45516* (2013.01); *G06F 8/4441* (2013.01)

(58) Field of Classification Search
None
See application file for complete search history.

(56) References Cited

U.S. PATENT DOCUMENTS

| | | | |
|---|---|---|---|
| 5,815,720 A | 9/1998 | Buzbee | |
| 6,412,107 B1 | 6/2002 | Cyran et al. | |
| 6,530,075 B1 * | 3/2003 | Beadle | G06F 9/45516 717/114 |
| 7,568,190 B2 | 7/2009 | Creamer et al. | |
| 7,926,051 B2 | 4/2011 | Barta et al. | |
| 2001/0032306 A1 * | 10/2001 | Duesterwald | G06F 9/30043 712/216 |
| 2009/0089767 A1 * | 4/2009 | Daynes | G06F 9/45516 717/148 |
| 2011/0035735 A1 * | 2/2011 | Kramp | G06F 9/4552 717/148 |
| 2012/0304160 A1 * | 11/2012 | Soeder | G06F 9/4426 717/148 |

(Continued)

FOREIGN PATENT DOCUMENTS

GB 2391348 A 2/2004

OTHER PUBLICATIONS

"Understanding Just-In-Time Compilation and Optimization", Oracle, 2011.*

(Continued)

*Primary Examiner* — Daxin Wu
(74) *Attorney, Agent, or Firm* — Heather S. Chatterton

(57) ABSTRACT

A method of optimizing software source code, where the source code is for execution as compiled bytecode using a just-in-time compiler. The source code is compiled to generate corresponding compiled bytecode. The bytecode is then executed using a just-in-time compiler. Run-time optimization actions performed by the just-in-time compiler during execution of the bytecode are determined, and analyzed to determine corresponding optimization data for the source code.

18 Claims, 5 Drawing Sheets

(56) References Cited

U.S. PATENT DOCUMENTS

| | | | | |
|---|---|---|---|---|
| 2013/0024661 A1* | 1/2013 | Abdallah | ............ | G06F 9/30174 |
| | | | | 712/205 |
| 2013/0067441 A1* | 3/2013 | Lafreniere | ................ | G06F 8/41 |
| | | | | 717/139 |
| 2014/0181591 A1* | 6/2014 | Bijanki | ............... | G06F 11/3684 |
| | | | | 714/38.1 |
| 2015/0089484 A1* | 3/2015 | Halambi | ............. | G06F 9/45516 |
| | | | | 717/148 |

OTHER PUBLICATIONS

Anonymous, "Guarded counting recompilations to facilitate aggressive phase-based compiler optimization," IP.com No. 000216312, IP.com Electronic Publication: Mar. 29, 2012, 4 pgs.

Anonymous, "Java JIT Profiles for Expected Workloads," IP.com No. 000212701, IP.com Electronic Publication: Nov. 23, 2011, 3 pgs.

Crowther et al., "Optimising Software Code," United Kingdom Application No. 1411364.1, filed Jun. 26, 2014.

International search report dated Dec. 23, 2014 for International Application No. GB1411364.1, 5 pgs.

* cited by examiner

OPTIMIZING SOFTWARE CODE

CROSS-REFERENCE TO RELATED APPLICATION

This application is related to and claims the benefit of United Kingdom Patent Application No. 1411364.1, filed Jun. 26, 2014, which application is incorporated by reference herein for all purposes.

BACKGROUND

The present disclosure relates to methods and systems for optimizing software source code. In particular, the disclosure concerns the optimization of software source code that is compiled into bytecode for execution using a just-in-time compiler.

"Just-in-time" compilation is a style of software code execution in which some compilation is performed at runtime, in other words as the software is being executed. It is common for source code to be compiled to intermediate bytecode ahead of execution, and then the bytecode is compiled and executed by the just-in-time compiler when the software is executed.

Software applications written using the JAVA programming language conventionally use this style of execution. Source code written in JAVA is compiled to JAVA bytecode, which can then be distributed. The JAVA bytecode can then be executed on any computer system with the required just-in-time compiler, known as the JAVA Virtual Machine.

SUMMARY

In accordance with a first aspect of the invention there is provided a method of optimizing software source code, wherein the source code is for execution as compiled bytecode using a just-in-time compiler, the method comprising the steps of: compiling the source code to generate corresponding compiled bytecode; executing the bytecode using a just-in-time compiler; determining run-time optimization actions performed by the just-in-time compiler during execution of the bytecode; and analysing the run-time optimization actions to determine corresponding optimization data for the source code.

In accordance with a second aspect of the invention there is provided a computer system for optimizing software source code, wherein the source code is for execution as compiled bytecode using a just-in-time compiler, the system comprising: a compiler arranged to compile the source code to generate corresponding compiled bytecode; and a just-in-time compiler arranged to execute the bytecode, wherein the system is arranged to: determine run-time optimization actions performed by the just-in-time compiler during execution of bytecode; and analyse the run-time optimization actions to determine corresponding optimization data for the source code.

In accordance with a third aspect of the invention there is provided a computer program product for optimizing software source code, the computer program product comprising a computer-readable storage medium having computer-readable program code embodied therewith, the computer-readable program code executable by a computing device to cause the device to perform the method described above.

BRIEF DESCRIPTION OF THE DRAWINGS

Embodiments of the present invention will now be described, by way of example only, with reference to the following drawings in which.

DETAILED DESCRIPTION

Figure 1:
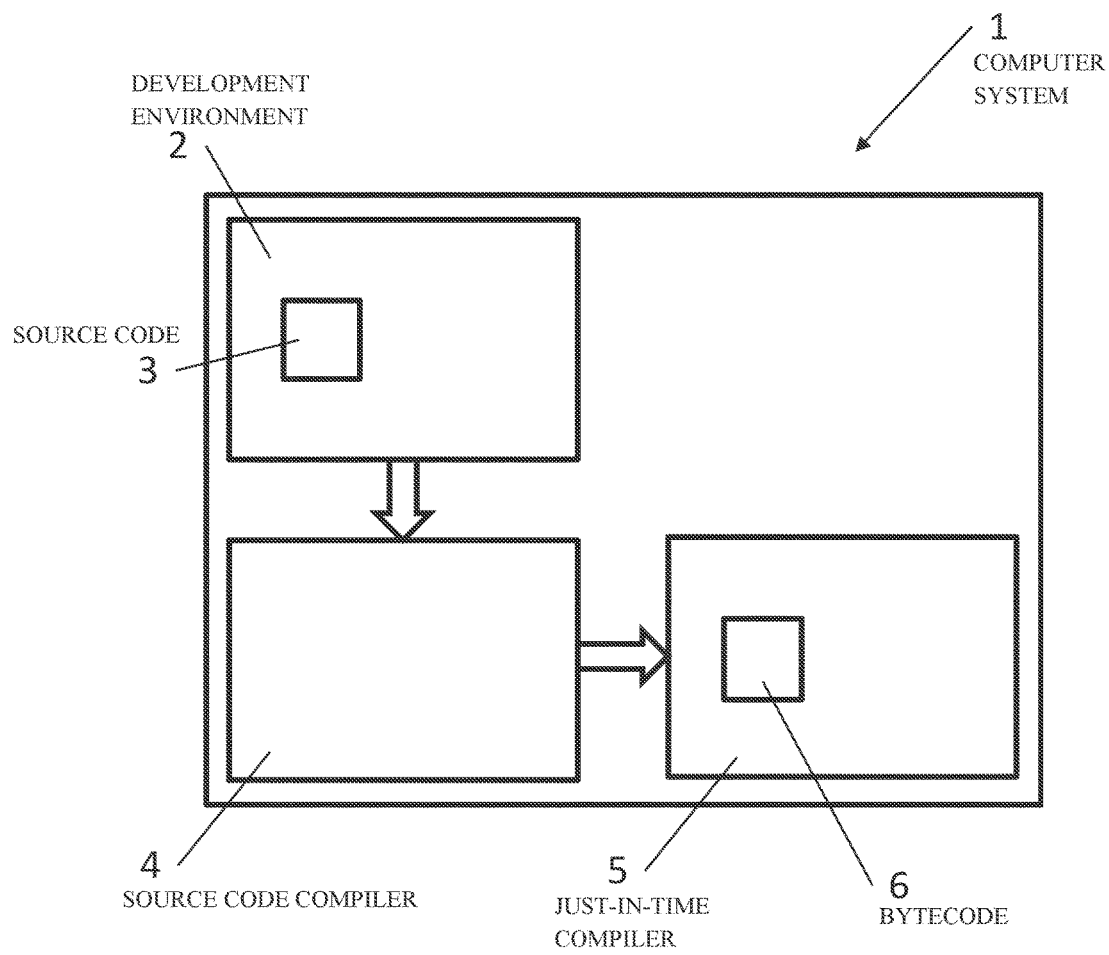
FIG. 1 is a schematic diagram of a computer system in which software code can be developed, and subsequently executed using a just-in-time compiler.

When the bytecode is compiled and executed by the just-in-time compiler, it is common for optimizations to be determined and applied. However, the overhead of calculating and applying the optimizations has a direct impact on measurable performance, with the result that it can take several minutes before the bytecode is being executed fully efficiently. In addition, it is often determined during just-in-time compilation that certain optimizations cannot be applied to the bytecode as a result of features of the underlying source code.

The present disclosure seeks to solve and/or mitigate some or all of the above-mentioned disadvantages. Alternatively and/or additionally, the present invention seeks to provide an improved method and systems for optimizing software source code.

In accordance with a first aspect of the invention there is provided a method of optimizing software source code, wherein the source code is for execution as compiled bytecode using a just-in-time compiler, the method comprising the steps of: compiling the source code to generate corresponding compiled bytecode; executing the bytecode using a just-in-time compiler; determining run-time optimization actions performed by the just-in-time compiler during execution of the bytecode; and analysing the run-time optimization actions to determine corresponding optimization data for the source code.

In this way, information about optimization performed by the just-in-time compiler during execution of the bytecode is obtained, and analysed to determine corresponding information about the source code. The information about the source code can then be fed back into the source code development process for modification of the source code, thus enabling more efficiently executable software to be produced. As the information is obtained from the optimization performed by the just-in-time compiler, the source code can be modified in particular to make the just-in-time compiler optimization quicker, more effective and less of an overhead.

Execution may be performed using one or more representative load tests, i.e. tests for execution of the bytecode that simulate its normal operation in some way.

The just-in-time compiler may be a bytecode compiler for the JAVA programming language.

Preferably, the run-time optimization actions comprise run-time optimizations made to the bytecode. In this case, the corresponding optimization data may indicate portions of the source code corresponding to the bytecode optimized by the run-time optimization. The corresponding optimization data may indicate the type of optimization made, and the level of optimization achieved.

Preferably, the run-time optimization actions also comprise determinations of run-time optimizations that cannot be made to the bytecode. In this case, the corresponding optimization data will indicate the portion of the source code preventing the run-time optimization from being made. The features of the source code preventing the run-time optimization from being made may include one or more of: code within a loop that modifies the bounds of the loop itself; loops where the index of the loop can be incremented by different amounts depending upon a condition; a loop which contains code that modifies a static variable.

The corresponding optimization data for a run-time optimization action may comprise a modification to the executable code of the source code. In the case that the run-time optimization action is a run-time optimization made to the bytecode, the modification will be such that bytecode generated by compiling source code incorporating the modification will provide, at least in part, the efficiency provided by the run-time optimization. In other words, the run-time optimization will already be present in the bytecode, reducing (or avoiding entirely) the need for the just-in-time complier to determine and apply the run-time optimization. In the case that the run-time optimization action is a determination of a run-time optimization that cannot be made to the bytecode, the modification will be such that bytecode generated by compiling source code incorporating the modification can be optimized at run-time using the run-time optimization that previously could not made. In other words, the modification will remove the feature of the source code that prevented the run-time optimization being possible. In the latter case, the modification may also be such that the bytecode provides (at least in part) the efficiency provided by the run-time optimization. In other words, the modification may both make the optimization possible, and in addition provide the optimization within the bytecode itself.

Preferably, the method further comprises the step of modifying the source code using the corresponding optimization data. The executable code of the source code may be modified directly, to automatically provide source code that compiles to give improved bytecode. Alternatively and/or additionally, the corresponding optimization data may be added as comments within the source code. In this case, preferably the comments are located in the source code in the portions corresponding to the bytecode upon which the run-time optimization action was performed.

Alternatively, a report containing the corresponding optimization data may be generated, for example.

Advantageously, the method further comprises iterating the steps of the method following modification of the source code. In other words, once the source code has been modified using corresponding optimization data, the entire method can be repeated so that run-time optimization actions performed by the just-in-time compiler on the modified source code can be determined.

Advantageously, the source code is developed in a development environment, and the analysis of the run-time optimization actions performed by the just-in-time compiler is performed by the development environment.

In accordance with a second aspect of the invention there is provided a computer system for optimizing software source code, wherein the source code is for execution as compiled bytecode using a just-in-time compiler, the system comprising: a compiler arranged to compile the source code to generate corresponding compiled bytecode; a just-in-time compiler arranged to execute the bytecode; wherein the system is arranged to: determine run-time optimization actions performed by the just-in-time compiler during execution of bytecode; and analyse the run-time optimization actions to determine corresponding optimization data for the source code.

Preferably, the run-time optimization actions comprise run-time optimizations made to the bytecode.

Preferably, the run-time optimization actions also comprise determinations of run-time optimizations that cannot be made to the bytecode.

The corresponding optimization data for a run-time optimization action may comprise a modification to the executable code of the source code.

Preferably, the computer system is further arranged to modify the source code using the corresponding optimization data.

Advantageously, the computer system further comprises a development environment for development of source code, arranged to perform the analysis of the run-time optimization actions performed by the just-in-time compiler.

In accordance with a third aspect of the invention there is provided a computer program product for optimizing software source code, the computer program product comprising a computer-readable storage medium having computer-readable program code embodied therewith, the computer-readable program code configured to perform any of the methods described above.

In accordance with a fourth aspect of the invention there is provided a computer program product for optimizing software source code, the computer program product comprising a computer-readable storage medium having computer-readable program code embodied therewith, the computer-readable program code configured when executed on a computer system to provide any of the computer systems described above.

A known computer system in which software code can be developed, and subsequently executed using a just-in-time compiler, is shown in FIG. 1. The computer system 1 comprises a development environment 2, with which a developer can develop source code 3 for software, such as a software application or code library. The computer system 1 further comprises a source code compiler 4 for compiling source code to bytecode. Finally, the computer system 1 further comprises a just-in-time compiler 5, with which bytecode 6 can be compiled and executed.

Figure 2:
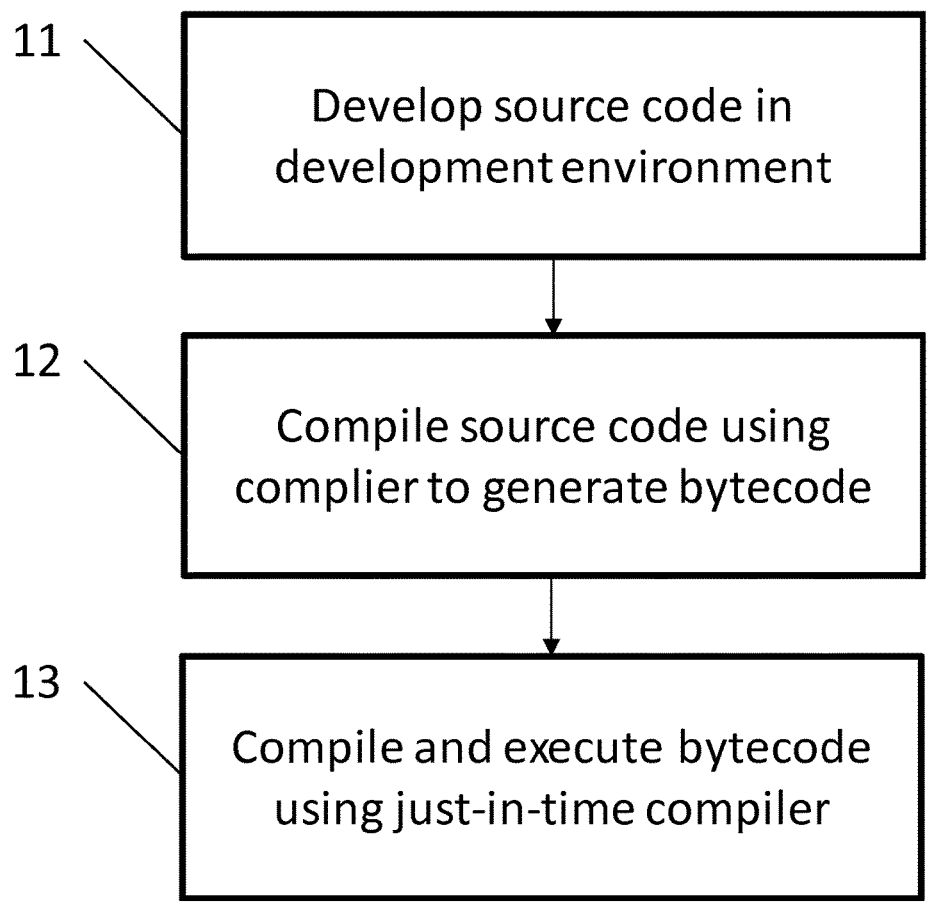
FIG. 2 is a flowchart showing the steps of developing and executing software using the computer system of FIG. 1.

The steps of developing and executing software using the computer system 1 are shown in the flowchart of FIG. 2. First, the source code 3 for the software is developed by the developer in the development environment 2 (step 11). Once development of the source code 2 has finished (i.e. when a final or intermediate test version of the software is completed), it is "committed" by the developer. The source code 3 is then passed to the source code compiler 4, which compiles it to generate bytecode 6 (step 12). The bytecode 6 is then passed to the just-in-time compiler 5, which compiles and executes it (step 13). This compilation and execution of the bytecode 6 by the just-in-time compiler 5 is the run-time execution of the software. If the bytecode 6 corresponds to the final version of the software, it can be distributed so that others can execute the software by executing the bytecode 6 on their own just-in-time compilers.

Figure 3:
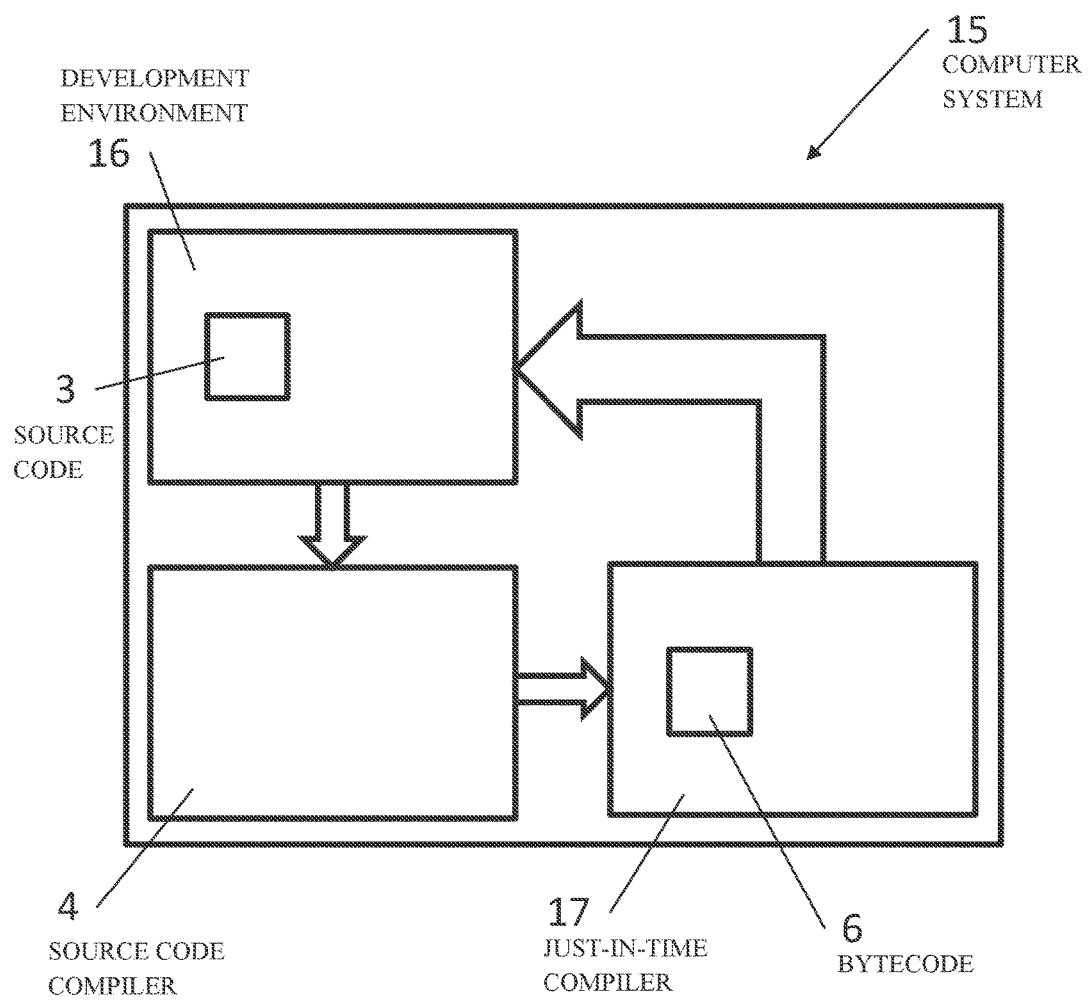
FIG. 3 is a schematic diagram of a computer system in accordance with an embodiment of the invention.

A computer system in accordance with an embodiment of the invention is shown in FIG. 3. The computer system 15 is very similar to that shown in FIG. 1, in that it comprises a development environment 16 for developing source code 3, a source code compiler 4, and a just-in-time compiler 17 for compiling and executing bytecode 6. However, as discussed in detail below, the just-in-time compiler 17 is arranged to pass data back to the development environment 16, and the development environment 16 is arranged to use that data.

Figure 4:
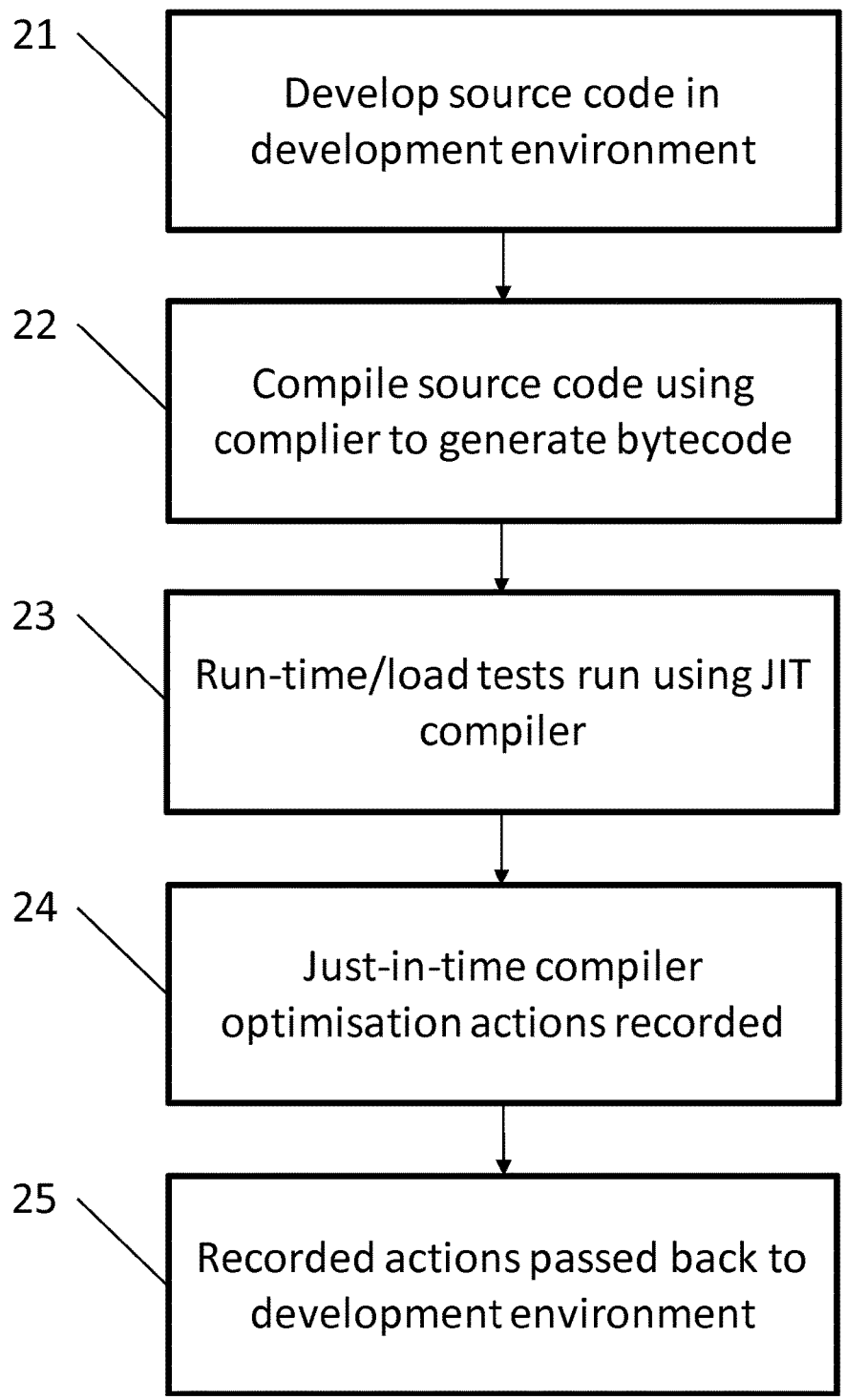
FIG. 4 is a flowchart showing the steps of developing and executing software using the computer system of FIG. 3.

The steps of developing and executing software using the computer system 15 are shown in the flowchart of FIG. 4. As before, first the source code 3 for the software is developed by the developer in the development environment 16 (step 21). Once development of the source code 2 has, it is "committed" by the developer. However, at this stage the developer can choose to have the run-time performance of the source code analysed. In this case, again as before the source code 3 is passed to the source code compiler 4, which compiles it to generate bytecode 6 (step 22).

Next, the bytecode 6 is then passed to the just-in-time compiler 17. The just-in-time compiler 17 then compiles and executes the bytecode 6 in accordance with a predetermined set of run-time/load tests (step 23). These tests will subject the software during execution to different conditions. For example, a first test could simply allow the software to execute until it is no longer performing any actions, for example because it is awaiting input. Other tests could provide predetermined inputs to the software during execution, or execute it in conditions that simulate there being a limit on the amount of memory or CPU time available to the software, for example.

During execution of the run-time/load tests, the just-in-time compiler 17 will perform various optimization actions upon the bytecode 6. The optimization actions performed by the just-in-time compiler 17 are determined and recorded (step 24), as described in more detail below. Once the run-time/load tests have completed, the details of the optimization actions performed by the just-in-time compiler 17 are then passed back to the development environment 16 (step 25).

An example of an optimization action performed by the just-in-time compiler 17 is "method in-lining". In this case, the source code 3 includes in one place a method call to a method in another part of the source code 4. When the bytecode 5 is being compiled and executed by the just-in-time compiler 17, the method in-lining optimization replaces the executed code corresponding to the source code method call with the executed code corresponding to the method that is called. This optimization allows the cost associated with the making the method call to be eliminated.

Another example of an optimization action performed by the just-in-time compiler 17 is a failed optimization, i.e. where the just-in-time compiler 17 determined that it was unable to perform an optimization due to the properties of the underlying source code. Examples of source code features that can lead to optimization failures may include: code within a loop that modifies the bounds of the loop itself; loops where the index of the loop can be incremented by different amounts depending upon a condition; a loop which contains code that modifies a static variable.

As well of details of the actual optimizations performed or unable to be performed, the details recorded may include metrics associated with the optimizations, for example the level of optimization achieved, and the time taken to apply more aggressive levels of optimization (i.e. the extra time taken to apply additional optimizations that provide more efficient execution of the software, but at the expense of additional time and resources being required to determine and apply the additional optimizations).

As discussed above, the details of the optimization actions performed by the just-in-time compiler 17 are then passed back to the development environment 16. In one embodiment of the invention, the development environment 16 report analyses the details and displays a report to the developer, and/or generates a report file. In an alternative embodiment, the report file may be generated by the just-in-time compiler 17 or an associated module using the recorded details. The developer can then use the information provided in the report and/or report file to modify the source code 3 as they deem appropriate.

Figure 5:
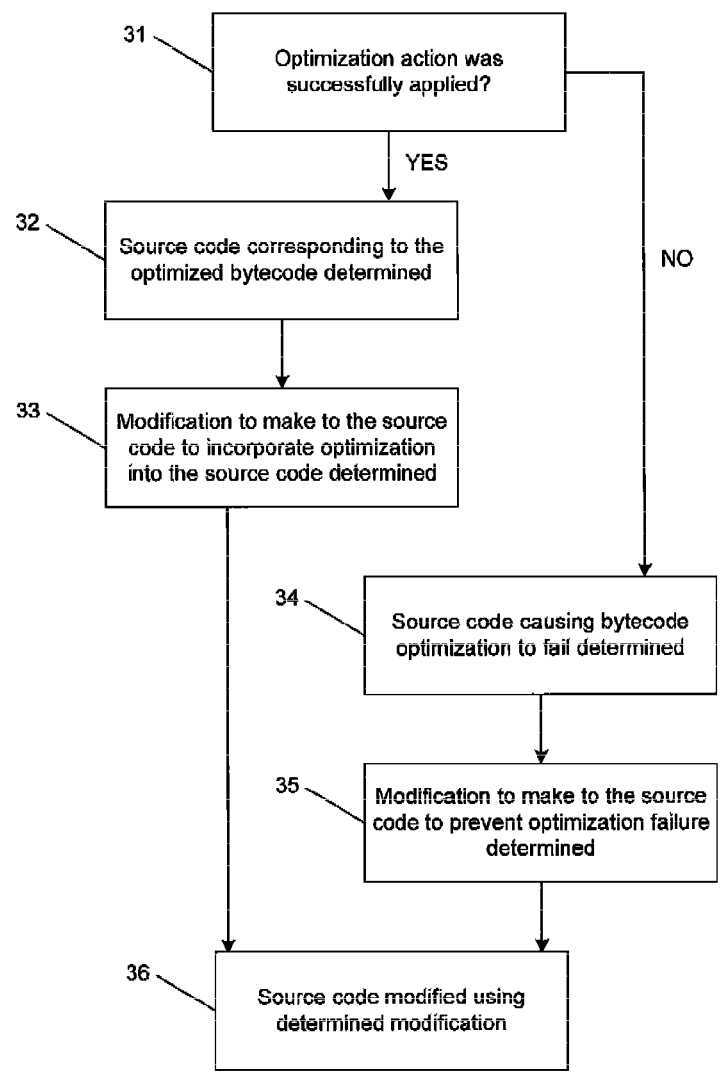
FIG. 5 is a flowchart showing the steps of modifying source code using the computer system of FIG. 3.

In an alternative embodiment, the development environment 16 uses the details of the optimization actions performed by the just-in-time compiler 17 to modify the source code 3. The steps of modifying the source code 3 are shown in the flowchart of FIG. 5.

First, the development environment 16 analyses an optimization action to determine whether it was a successfully applied optimization or a failed optimization (step 31).

If the optimization action was a successfully applied optimization, the development environment 16 determines the source code 3 corresponding to the bytecode that was optimized (step 32). A modification to the source code 3 for the applied optimization is then determined (step 33).

If, on the other hand, the optimization action was a failed optimization, the development environment 16 determines the source code 3 corresponding to the bytecode that failed to be optimized (step 34). A modification to the source code 3 for the failed optimization is then determined (step 35).

In either case, the source code 3 is then modified using the determined modification (step 36). This may involve the executable code of the source code 3 being modified to directly apply the optimization. For example, in the case that a method in-line optimization was applied, the method call in the source code 3 would be replaced with the code of the called method. For another example, in the case that an optimization failed to be applied because a loop contained code that modified a static variable, the modification would be moved outside of the loop (if appropriate). For example, a developer could have coded the following method:

```
public static int myStaticX;
public void myLoop( ) {
    for (int i=0; i<100; i++) {
        myStaticX = i;
    }
}
```

A modification of this method code to move the modification of the static variable to outside the loop could be as follows:

```
public static int myStaticX;
public void myLoop( ) {
    int temp = 0;
    for (int i=0; i<100; i++) {
        temp = i;
    }
    myStaticX = temp
}
```

Alternatively and/or additionally to modifying the executable code of the source code 3, the source code 3 could be modified to include comments indicating the type of optimization and any recorded metrics and the like. In the case that the modification included the addition of comments only, the developer could then subsequently use the information provided by the comments to modify the source code 3 as they deemed appropriate.

Whilst the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or control code written in any combination of one or more programming languages, including an control oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of optimizing software source code, wherein the source code is for execution as compiled bytecode using a just-in-time compiler, the method comprising the steps of:
   compiling the source code to generate corresponding compiled bytecode;
   executing the bytecode using the just-in-time compiler;

determining run-time optimization actions performed by the just-in-time compiler during execution of the bytecode using a set of run-time tests and load tests; and analysing the run-time optimization actions to determine corresponding optimization data for the source code, the optimization data indicating a portion of the source code corresponding to a portion of the bytecode optimized by the run-time optimization, the type of optimization made, and the level of optimization achieved;

determining a modification to the source code, using the corresponding optimization data for the source code, to incorporate the run-time optimization actions performed by the just-in-time compiler into the source code; and modifying the source code according to the modification determined.

2. The method of claim 1, wherein the run-time optimization actions comprise determinations of run-time optimizations that cannot be made to the bytecode and wherein the optimization data indicates a portion of the source code corresponding to a portion of the bytecode preventing run-time optimization.

3. The method of claim 2, further comprising determining a modification to the source code, using the corresponding optimization data for the source code, to remove a feature, from the source code, preventing the run-time optimization actions from being performed by the just-in-time compiler: and modifying the source code according to the modification determined.

4. The method of claim 1, wherein the corresponding optimization data for a run-time optimization action comprises a modification to executable code of the source code.

5. The method of claim 1, further comprising:

compiling the modified source code to generate a second compiled bytecode;

executing the second bytecode using the just-in-time compiler;

determining second run-time optimization actions performed by the just-in-time compiler during execution of the second bytecode; and analysing the second run-time optimization actions to determine corresponding optimization data for the modified source code.

6. The method of claim 5, further comprising determining a second modification to the modified source code, using the corresponding optimization data for the modified source code, to incorporate the second run-time optimization actions performed by the just-in-time compiler into the source code; and modifying the modified source code according to the modification determined.

7. The method of claim 5, further comprising determining a third modification to the modified source code, using the corresponding optimization data for the modified source code, to remove a feature, from the source code, preventing the run-time optimization actions from being performed by the just-in-time compiler: and modifying the modified source code according to the modification determined.

8. The method of claim 1, wherein the source code is developed in a development environment, and the analysis of the run-time optimization actions performed by the just-in-time compiler is performed by the development environment.

9. A computer system for optimizing software source code, wherein the source code is for execution as compiled bytecode using a just-in-time compiler, the system comprising:

a hardware processor comprising a compiler arranged to compile the source code to generate corresponding compiled bytecode; and the just-in-time compiler arranged to execute the bytecode, wherein the system is arranged to:

determine run-time optimization actions performed by the just-in-time compiler during execution of the bytecode using a set of run-time tests and load tests; and analyse the run-time optimization actions to determine corresponding optimization data for the source code, the optimization data indicating a portion of the source code corresponding to a portion of the bytecode optimized by the run-time optimization, the type of optimization made, and the level of optimization achieved;

determine a modification to the source code, using the corresponding optimization data for the source code, to incorporate the run-time optimization actions performed by the just-in-time compiler into the source code;

modify the source code according to the modification determined.

10. The computer system of claim 9, wherein the run-time optimization actions comprise determinations of run-time optimizations that cannot be made to the bytecode and wherein the optimization data indicates a portion of the source corresponding to a portion of the bytecode preventing run-time optimization.

11. The computer system of claim 10, wherein the system is further arranged to: determine a modification to the source code, using the corresponding optimization data for the source code, to remove a feature, from the source code, prevent the run-time optimization actions from being performed by the just-in-time compiler: and modify the source code according to the modification determined.

12. The computer system of claim 9, wherein the corresponding optimization data for a run-time optimization action comprises a modification to the executable code of the source code.

13. The computer system of claim 9, further comprising a development environment for development of source code, arranged to perform the analysis of the run-time optimization actions performed by the just-in-time compiler.

14. A computer program product for optimizing software source code, wherein the source code is for execution as compiled bytecode using a just-in-time compiler, the computer program product comprising a computer-readable storage medium having computer-readable program code embodied therewith, the program code executable by a computing device to cause the device to perform a method comprising:

compiling the source code to generate corresponding compiled bytecode;

executing the bytecode using a just-in-time compiler;

determining run-time optimization actions performed by the just-in-time compiler during execution of the bytecode using a set of run-time tests and load tests;

analysing the run-time optimization actions to determine corresponding optimization data for the source code, the optimization data indicating a portion of the source code corresponding to a portion of the bytecode optimized by the run-time optimization, the type of optimization made, and the level of optimization achieved;

determining a modification to the source code, using the corresponding optimization data for the source code, to incorporate the run-time optimization actions performed by the just-in-time compiler into the source code; and modifying the source code according to the modification determined.

15. The computer program product of claim 14, wherein the run-time optimization actions comprise determinations of run-time optimizations that cannot be made to the bytecode and wherein the optimization data indicates a portion of the source corresponding to a portion of the bytecode preventing run-time optimization.

16. The computer program product of claim 15, wherein the method further comprising determining a modification to the source code, using the corresponding optimization data for the source code, to remove a feature, from the source code, preventing the run-time optimization actions from being performed by the just-in-time compiler: and modifying the source code according to the modification determined.

17. The computer program product of claim 14, wherein the corresponding optimization data for a run-time optimization action comprises a modification to executable code of the source code.

18. The computer program product of claim 14, wherein the method further comprises:
  compiling the modified source code to generate a second compiled bytecode;
  executing the second bytecode using the just-in-time compiler;
  determining second run-time optimization actions performed by the just-in-time compiler during execution of the second bytecode; and
  analysing the second run-time optimization actions to determine corresponding optimization data for the modified source code.

* * * * *